United States Patent
Asaka

[11] 3,844,259
[45] Oct. 29, 1974

[54] AUXILIARY CHAMBER CONSTRUCTION FOR INTERNAL COMBUSTION

[75] Inventor: Urataro Asaka, Kamifukuoka, Japan

[73] Assignee: Honda Giken Kogyo Kabushiki Kaisha, Tokyo, Japan

[22] Filed: Nov. 29, 1972

[21] Appl. No.: 310,406

[52] U.S. Cl............ 123/32 SP, 123/32 ST
[51] Int. Cl......... F02b 19/10, F02b 19/16
[58] Field of Search............. 123/32 SP, 32 ST

[56] References Cited
UNITED STATES PATENTS

| | | | |
|---|---|---|---|
| 1,616,157 | 2/1927 | Werner | 123/32 SP |
| 2,065,419 | 12/1936 | Bagnulo | 123/32 SP |
| 2,435,659 | 2/1948 | Summers | 123/32 SP |
| 3,140,697 | 7/1964 | Peras | 123/32 SP |
| 3,508,530 | 4/1970 | Clawson | 123/32 SP |

FOREIGN PATENTS OR APPLICATIONS

| | | | |
|---|---|---|---|
| 784,481 | 10/1957 | Great Britain | 123/32 SP |
| 671,749 | 12/1929 | France | 123/32 SP |
| 535,029 | 10/1955 | Italy | 123/32 SP |
| 533,223 | 9/1955 | Italy | 123/32 SP |
| 872,883 | 7/1949 | Germany | 123/32 SP |

Primary Examiner—Laurence M. Goodridge
Assistant Examiner—Ronald B. Cox
Attorney, Agent, or Firm—Lyon & Lyon

[57] ABSTRACT

An internal combustion engine has a main combustion chamber and an auxiliary combustion chamber defined within a thin-wall metallic cup formed of heat resistant material. The cup has a first aperture communicating with the main combustion chamber and a second aperture communicating with a spark plug. A first inlet valve introduces a lean combustible mixture into the main combustion chamber and a second inlet valve introduces a rich combustible mixture into the interior of the cup. A ported guide for the auxiliary inlet valve clamps a flange of the cup to hold it in place.

2 Claims, 1 Drawing Figure

PATENTED OCT 29 1974 3,844,259
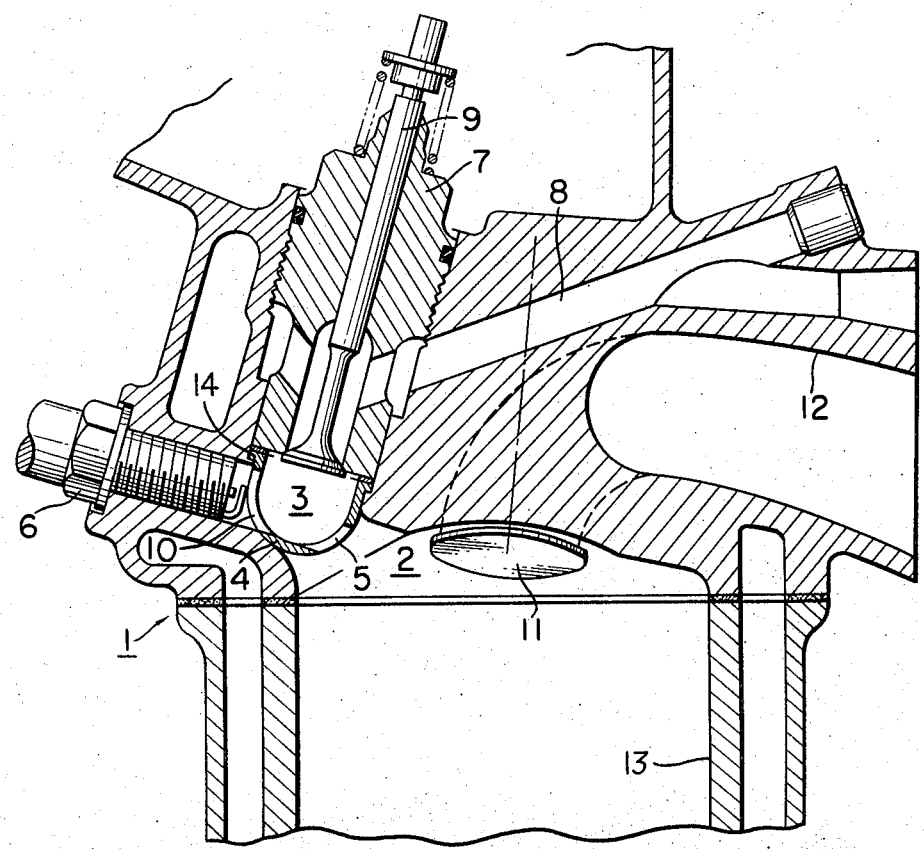

AUXILIARY CHAMBER CONSTRUCTION FOR INTERNAL COMBUSTION

This invention relates to internal combustion engines of the type in which each cylinder has a main combustion chamber provided with the usual intake valve and exhaust valve, and wherein there is a third valve controlling inlet to an auxiliary chamber equipped with a spark plug. Each auxiliary chamber communicates with its respective main chamber through a small opening known as a "torch nozzle." A lean air-fuel mixture is supplied to the main combustion chamber through its intake valve, and a rich air-fuel mixture is supplied to the auxiliary combustion chamber through its intake valve. In operation, the rich mixture is readily ignited by the spark plug and the resulting blast of flame issuing through the torch nozzle ignites the lean mixture in the main chamber.

It is desirable that the metal walls of the engine be water-cooled, but it is also desirable that the walls of the auxiliary chamber heat up rapidly and remain hot to avoid undesirable condensation of the rich mixture. In accordance with this invention, a metallic cup formed of heat resistant material such as stainless steel is placed in a cavity formed in the engine walls. The cup has low heat capacity. The cup is provided with an aperture communicating with the spark plug and with another aperture communicating with the main combustion chamber. This second aperture constitutes the torch nozzle.

Other and more detailed objects and advantages will appear hereinafter.

The drawing is a transverse sectional view through a portion of an internal combustion engine and shows a preferred embodiment of this invention.

Referring to the drawing, the internal combustion engine 1 has walls formed of lightweight metal such as aluminum alloy. A main combustion chamber 2 is formed within the cylinder wall 13 above the piston (not shown). An auxiliary combustion chamber 3 is formed within a thin wall cup 4 exposed to the interior of the main combustion chamber 2. The cup 4 is formed of a heat resisting material such as stainless steel. An aperture 5 in the exposed portion of the cup serves as a torch nozzle communicating between the auxiliary combustion chamber 3 and the main combustion chamber 2. A spark plug 6 is positioned adjacent the metallic cup 4 and the aperture 10 in the cup establishes communication between the spark plug and the auxiliary chamber 3. The spark plug electrodes are located outside the thin wall cup 4. The round bottom of the cup closes the lower end of the cavity into which the cup is installed. The cup aperture 5 and 10 are located on opposite sides of the cup 4.

A ported valve guide member 7 slidably supports the auxiliary inlet valve 9, and it also serves to clamp the terminal flange 14 of the cup 4 in position against movement. The auxiliary inlet passage 8 serves to introduce a rich combustible mixture into the auxiliary combustion chamber when the valve 9 is open. The exhaust valve (not shown) and the main chamber inlet valve 11, as well as the auxiliary inlet valve 9, are all operated by conventional valve actuating mechanism.

When the main inlet valve 11 is open, lean combustible mixture is drawn into the main combustion chamber 2 through the inlet passage 12. Rich mixture is drawn into the auxiliary chamber 3 through the passage 8. A spark between the electrodes of the spark plug 6 ignites the rich mixture in the auxiliary chamber 3 and the resultant flame projects through the torch nozzle 5 into the main combustion chamber 2 to ignite and burn the lean mixture therein.

The thin round bottom of the wall metallic cup 4 is partly exposed to the interior of the main combustion chamber 2, and since it has relatively small heat capacity, the cup 4 is heated immediately upon starting of the engine and stays hot so long as the engine is operating. This insures that the rich mixture introduced through the passage 8 remains in vaporized condition.

The thin wall metallic cup may readily be withdrawn from the engine by unscrewing the ported guide member 7. In this way the volume of the auxiliary combustion chamber 3 may be changed by substituting a different metallic cup 4. Moreover, since the auxiliary combustion chamber 3 is formed within the cup, and not directly formed within the walls of the engine 1, the machining of the walls is facilitated.

Having fully described my invention, it is to be understood that I am not to be limited to the details herein set forth but that my invention is of the full scope of the appended claims.

I claim:

1. In an internal combustion engine, the combination of: walls forming a main combustion chamber, walls forming a cavity for an auxiliary combustion chamber, a thin wall metallic cup formed of heat resistance material positioned in said cavity, said cup having a round bottom closing said cavity with respect to said main combustion chamber, a portion of said round bottom being exposed to said main combustion chamber, a spark plug supported near said cup having its electrodes outside said cup, said cup having a first aperture in said round bottom communicating with the main combustion chamber and a second aperture communicating with the spark plug electrodes, the interior of the cup comprising an auxiliary combustion chamber, valve means for introducing a lean combustible mixture into the main combustion chamber, and additional valve means for introducing a rich combustible mixture into the interior of said cup.

2. The combination set forth in claim 1 in which a ported guide member slidably supports a valve for the auxiliary combustion chamber, a flange on said cup being removably clamped in place by means of said guide member.

* * * * *

UNITED STATES PATENT OFFICE
CERTIFICATE OF CORRECTION

Patent No. 3,844,259           Dated  October 29, 1974

Inventor(s) Urataro Asaka

It is certified that error appears in the above-identified patent and that said Letters Patent are hereby corrected as shown below:

On first page, the title [54] should read --AUXILIARY CHAMBER CONSTRUCTION FOR INTERNAL COMBUSTION ENGINE--

On first page, after line [21] there should be inserted:
[30]  Foreign Application Priority Date
      December 6, 1971   Japan . . . . . 114008/71

Col. 1, lines 1 and 2, the title should read --AUXILIARY CHAMBER CONSTRUCTION FOR INTERNAL COMBUSTION ENGINE--

Col. 1, line 53, "aperture" should read --apertures--

Col. 2, line 15, "thin round bottom of the" should read --round bottom of the thin--

Col. 2, line 22, after "cup" insert --4--

Claim 1, line 38 of col. 2, "resistance" should read --resistant--

Insert Claim 3 reading as follows:

--3. In an internal combustion engine, the combination of: walls forming a main combustion chamber, walls forming a cavity for an auxiliary combustion chamber, a thin wall metallic cup

UNITED STATES PATENT OFFICE
CERTIFICATE OF CORRECTION

Patent No. 3,844,259    Dated October 29, 1974

Inventor(s) Urataro Asaka

It is certified that error appears in the above-identified patent and that said Letters Patent are hereby corrected as shown below:

PAGE 2

(Claim 3 cont)
formed of heat resistant material positioned in said cavity, said cup having a round bottom closing said cavity with respect to said main combustion chamber, a portion of said round bottom being exposed to said main combustion chamber, a spark plug supported near said cup having its electrodes outside said cup, said cup having a first aperture communicating with the main combustion chamber and a second aperture communicating with the spark plug electrodes, the interior of the cup comprising an auxiliary combustion chamber, valve means for introducing a lean combustible mixture into the main combustion chamber, and additional valve means for introducing a rich combustible mixture into the interior of said cup.--
On the cover sheet "2 Claims" should read -- 3 Claims --.

Signed and sealed this 21st day of January 1975.

(SEAL)
Attest:

McCOY M. GIBSON JR.
Attesting Officer

C. MARSHALL DANN
Commissioner of Patents